United States Patent [19]

Andrae

[11] 4,338,083

[45] Jul. 6, 1982

[54] APPARATUS FOR TRANSFERRING TABLET STRIP PACKAGES

[75] Inventor: Rolf Andrae, Fellbach, Fed. Rep. of Germany

[73] Assignee: Robert Bosch GmbH, Stuttgart, Fed. Rep. of Germany

[21] Appl. No.: 149,366

[22] Filed: May 13, 1980

[30] Foreign Application Priority Data

May 31, 1979 [DE] Fed. Rep. of Germany ....... 2922171

[51] Int. Cl.³ .............................................. B31B 1/16
[52] U.S. Cl. .................................... 493/239; 83/152; 83/154; 198/480; 198/631; 493/372
[58] Field of Search ............... 493/239, 315, 317, 318, 493/313, 372; 83/154, 152, 153, 100; 271/94, 95; 198/689, 480, 488, 631

[56] References Cited

U.S. PATENT DOCUMENTS

| 2,437,994 | 3/1948 | Beyer | 83/154 |
| 2,831,684 | 4/1958 | Cundall | 83/154 X |
| 2,887,022 | 5/1959 | Lubersky et al. | 493/315 X |
| 3,221,582 | 12/1965 | Dreher | 83/152 X |
| 3,512,436 | 5/1970 | Neuber | 83/152 X |
| 3,683,730 | 8/1972 | Driessen | 83/152 X |

Primary Examiner—James F. Coan
Attorney, Agent, or Firm—Edwin E. Greigg

[57] ABSTRACT

An apparatus in which tablet strip packages are transferred with the aid of revolving suction devices out of a horizontally-functioning stamping device to a horizontally disposed conveyor belt. The suction devices are radially secured on a transfer head, which is rotatably supported on a swing. Thus, a straight-line transfer path from stamping device to conveyor belt is provided which allows for a shorter transfer time.

4 Claims, 2 Drawing Figures

APPARATUS FOR TRANSFERRING TABLET STRIP PACKAGES

BACKGROUND OF THE INVENTION

In the processing of tablet strip packages, especially in boxing such packages, the tablets are in one continuous strip during manufacturing, filling, and closing. After being stamped out from this strip the tablets are transported in a form-fitting manner to be inserted into the folding boxes. This movement of the packages is efficiently accomplished with the aid of a conveyor belt which can be provided with vanes for fixing the position of the tablet strip packages. Means are then disposed immediately adjacent this conveyor belt for gripping the tablet strip packages and inserting them into a folding box—which is the preferred embodiment when boxing machines function cyclically—or into the bucket conveyor of a continuously operating boxing machine. One of the most difficult aspects of transporting tablet strip packages appears, especially in high-speed machines, in the transfer of the tablet strip packages from the stamping device to the conveyor belt. With stamping machines that function horizontally and a horizontally disposed conveyor belt, a suction device which is pivotable about an angle of 90° is generally used. With these devices, the suction device rotates about a shaft in a circular manner. Thus, the path from stamping maching to conveyor belt is an arc segment.

In order to avoid using a conveyor device of this kind, the arrangement of a known apparatus such as German Offenlegungsschrift No. 27 05 293 wherein the tablet strip packages coming from the stamping device are pushed directly into a reception chamber. This mode of operation has the disadvantage, however, that there is no opportunity to select out tablet strip packages which are not completely filled. Selecting out incompletely filled packages is absolutely necessesary, especially in the case of medicines, so the patient does not receive tablet strip packages which contain no medicine. A machine is accordingly sought in which selecting out incompletely filled tablet strip packages and rapid transfer of the tablet strip packages from the stamping device to the conveyor belt is assured.

OBJECT AND SUMMARY OF THE INVENTION

The apparatus according to the invention for transferring tablet strip packages has the advantage of a very high operating speed. This high operating speed is attainable because straight-line, short travel paths are established between the stamping device and the conveyor belt as a result of the pivoting suspension of the transfer head and the movement of the suction devices in the identical direction. The apparatus is further distinguished by its simple structure, and it is also advantageous that drive elements already present in the machine are used.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
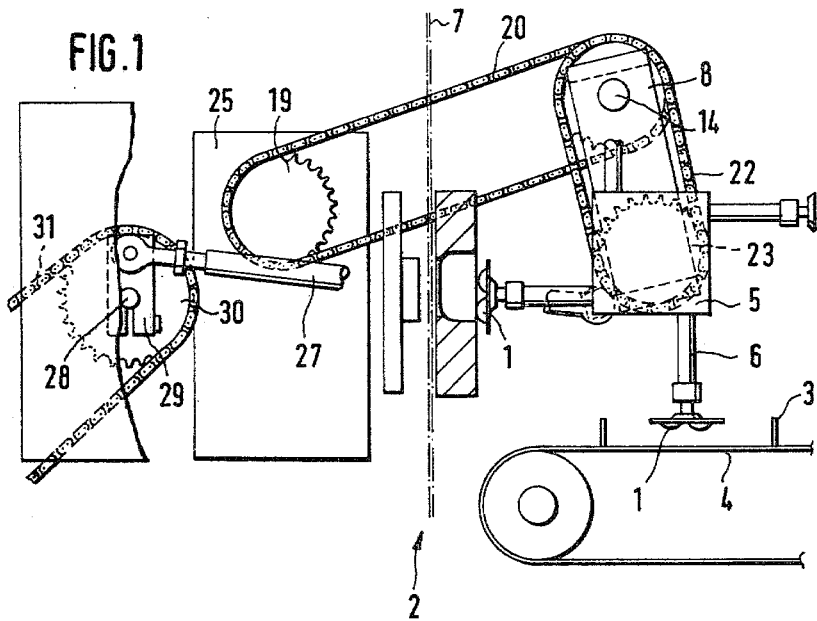
FIG. 1 is a front view of the apparatus according to the invention.

As shown in the drawings, the apparatus according to the invention for transferring tablet strip packages 1 (from a stamping device 2 to a conveyor belt 4 provided with vanes 3) substantially comprises a transfer head 5, on which four suction devices 6 are disposed, displaced 90° relative to one another. The foil strip 7 from which the tablet strip packages 1 are stamped is shown in FIG. 1. As particularly shown in FIG. 2, the transfer head 5 is connected to a spacer sheath 9, which with interposed control discs 10, 11 and 12 communicates with a shaft 13 supported in a swing 8. The swing 8 is pivotably disposed on a shaft 14, which in turn is secured in bearings 17 and 18 provided on side walls 15 and 16 of the machine, which itself is not shown. To drive the transfer head 5, a chain drive is provided comprising a chain wheel 19, a chain 20, a double chain wheel 21, a chain 22 and a chain wheel 23. The drive is effected, beginning with the chain wheel 19, which is secured on a shaft 24 of a stepping gear 25 mechanically connected via the drive system with the stamping device 2 in a known manner. The double chain wheel 21 is loosely supported on the shaft 14, while the chain wheel 23 is connected via a flange 26 with the shaft 13. The pivoting motion for the swing 8 is effected via a piston-like connecting rod 27, whose drive is derived from a shaft 28 of the stamping device 2 via a crank 29. A chain wheel 30 is furthermore secured on the shaft 28 and is driven by a chain 31, which is connected with the main drive (not shown) of the machine.

Figure 2:
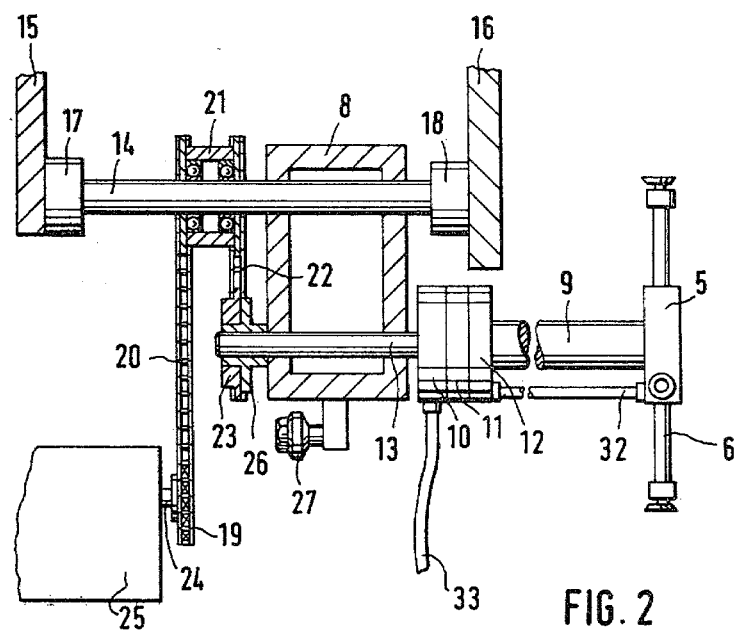
FIG. 2 is a side view of the apparatus shown in FIG. 1.

As may be seen in FIG. 2 in particular, a plurality of air suction lines 32 are provided which connect each suction device 6 with the control disc 12. For the sake of clarity, only one vacuum or air suction line 32 of this kind is shown. An air suction line 33 connected to the control disc 10 leads to a vacuum pump, not shown.

The mode of operation of the apparatus is as follows:

After a tablet strip package 1 is stamped out from the foil strip 7 by stamping device 2, the tablet strip package 1 is gripped by a suction device 6. Each time a tablet strip package 1 is gripped by a suction device 6—that is, after each stamping stroke—swing 8 moves counterclockwise about shaft 14 in response to the piston-like movement of rod 27. Simultaneously, the transfer head 5 and thus the suction devices 6 are pivoted 90° in a counterclockwise direction by the chain drive. This pivot motion of transfer head 5 and suction device 6 is partially superimposed on the swinging movement. Accordingly, the particular tablet strip package 1 being gripped by one suction device 6 is drawn outward in a straight path from the area of the stamping device 2 to the conveyor belt 4. The vacuum control of the suction device 6 in action at a particular time is accomplished in a known manner via the vacuum control discs 10, 11 and 12. By means of this arrangement of the invention, the transfer head 5 and thus the suction devices 6 are guided back to the stamping device 2 in a comparable swinging manner during the resting phase of the stepping gear 25.

It should be noted that the invention will also function when only one suction device is used. To compensate, the transfer head may be pivoted in a faster manner. Any number of suction devices may be used to transfer the tablet strip packages.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for processing strip packages, having:
   a horizontally operating stamping device to stamp out strip packages;
   a horizontal conveyor belt to transport the strip packages;
   a plurality of suction devices to grip the strip packages and to transfer the strip packages from the stamping device to the conveyor belt;
   a transfer head on which the plurality of suction devices are mounted, wherein the transfer head is moved in a swinging manner;
   a swing which supports the transfer head, wherein the swing moves and carries the transfer head through one swinging movement for each stamping stroke of the stamping device, and wherein the swing is connected to pivot the transfer head 90° for each swinging movement such that the pivot of the transfer head is partially superimposed on the swinging movement of the transfer head.

2. An apparatus as defined in claim 1, further having:
   a stepping gear connected to the stamping device;
   at least one drive chain connected to the transfer head to impart pivotal movement to the transfer head;
   wherein the stepping gear determines the operation of the at least one drive chain.

3. An apparatus as defined in claim 2, wherein:
   the stepping gear is mounted on a drive shaft;
   the swing is supported on a first shaft;
   the transfer head is firmly connected on a second shaft;
   wherein the apparatus further includes:
   a plurality of drive chains to impart pivotal motion to the transfer heads;
   a plurality of chain wheels to carry the plurality of drive chains;
   such that a first drive chain connects the drive shaft with a first chain wheel which is loosely supported on the first shaft; and wherein, a second drive chain connects the first chain wheel to a second chain wheel which is firmly connected on the second shaft.

4. An apparatus as defined in claim 1, further having:
   a drive shaft powered by the stamping device;
   a crank which is mounted on the drive shaft;
   a connecting rod to connect the crank to the swing;
   such that the drive shaft crank, and connecting rod are operable to determine the swinging movement of the swing.

* * * * *